United States Patent
Dietz

(10) Patent No.: US 10,695,863 B1
(45) Date of Patent: Jun. 30, 2020

(54) METHOD AND DEVICE FOR THE CONTROLLED MACHINING OF A WORKPIECE

(71) Applicant: Precitec Optronik GmbH, Neu-Isenburg (DE)

(72) Inventor: Christoph Dietz, Obertshausen (DE)

(73) Assignee: Precitec Optronik GmbH (DE)

( * ) Notice: Subject to any disclaimer, the term of this patent is extended or adjusted under 35 U.S.C. 154(b) by 0 days.

(21) Appl. No.: 16/548,939

(22) Filed: Aug. 23, 2019

(30) Foreign Application Priority Data

Jun. 14, 2019 (DE) .......................... 10 2019 116 309

(51) Int. Cl.
*B23K 26/04* (2014.01)
*B23K 26/03* (2006.01)
(Continued)

(52) U.S. Cl.
CPC .......... *B23K 26/048* (2013.01); *B23K 26/032* (2013.01); *B23K 26/043* (2013.01);
(Continued)

(58) Field of Classification Search
CPC .. B23K 26/048; B23K 26/707; B23K 26/032; B23K 26/043; B23K 26/0643; B23K 26/0648; B23K 26/0661; B23K 26/0876
See application file for complete search history.

(56) References Cited

U.S. PATENT DOCUMENTS 4,748,322 A    5/1988 Breitmeier
6,713,718 B1   3/2004 Lu
(Continued)

FOREIGN PATENT DOCUMENTS

DE    3536700    4/1987
DE    10155203   6/2003
(Continued)

OTHER PUBLICATIONS

Jeong, et al.; Article entitled: "High-speed 3-D measurement with a large field of view based on direct-view confocal microscope with an electrically tunable lens", Optical Society of America, published Feb. 16, 2016, 11 pgs.
(Continued)

*Primary Examiner* — Brian W Jennison
(74) *Attorney, Agent, or Firm* — Taylor English Duma LLP

(57) ABSTRACT

A method for controlled machining of a workpiece includes focusing a laser light beam on a target point of the workpiece to generate a laser focus point. An optical distance measuring device gathers measuring data to determine a distance between the target point and a laser target optics. The workpiece is positioned in relation to the laser focus point based on the distance measuring data gathered. The distance measuring device is a confocal optical distance measuring device having a measuring light source for generating a measuring light and having a variable-focal-length measuring lens system. The focal length of the variable-focal-length measuring lens system is varied over time to gather distance measuring data at different focal length values of the variable-focal-length measuring lens system. A device for controlled machining includes a laser light source, a laser target optics, a distance measuring device, a positioning device, and an evaluation and control unit.

22 Claims, 8 Drawing Sheets

(51) Int. Cl.
    *B23K 26/70* (2014.01)
    *B23K 26/06* (2014.01)
    *B23K 26/08* (2014.01)

(52) U.S. Cl.
    CPC ...... *B23K 26/0643* (2013.01); *B23K 26/0648* (2013.01); *B23K 26/0661* (2013.01); *B23K 26/0876* (2013.01); *B23K 26/707* (2015.10)

(56) References Cited

U.S. PATENT DOCUMENTS

| | | | |
|---|---|---|---|
| 2009/0004763 A1* | 1/2009 | Ono | B23K 26/048 438/7 |
| 2013/0188178 A1* | 7/2013 | Keen | B23K 26/032 356/122 |
| 2016/0000535 A1 | 1/2016 | Atiya et al. | |
| 2018/0221990 A1* | 8/2018 | Aoki | B23K 26/032 |

FOREIGN PATENT DOCUMENTS

| | | |
|---|---|---|
| DE | 102006046370 | 4/2008 |
| DE | 102016219632 | 4/2018 |
| EP | 2952850 | 12/2015 |

OTHER PUBLICATIONS

Kaplan, et at; Article entitled: "Acousto-optic lens with very fast focus scanning", Optical Letters, vol. 26, No. 14, Jul. 15, 2001, 4 pgs.

Optotune; Datasheet entitled: "Fast Electrically Tunable Lens EL-3-10", Copyright 2018, 8 pgs.

Precitec Optronik Gmbh; International Search Report and Written Opinion for PCT/DE2019/100927, filed Oct. 28, 2019, dated Feb. 3, 2020, 15 pgs.

* cited by examiner

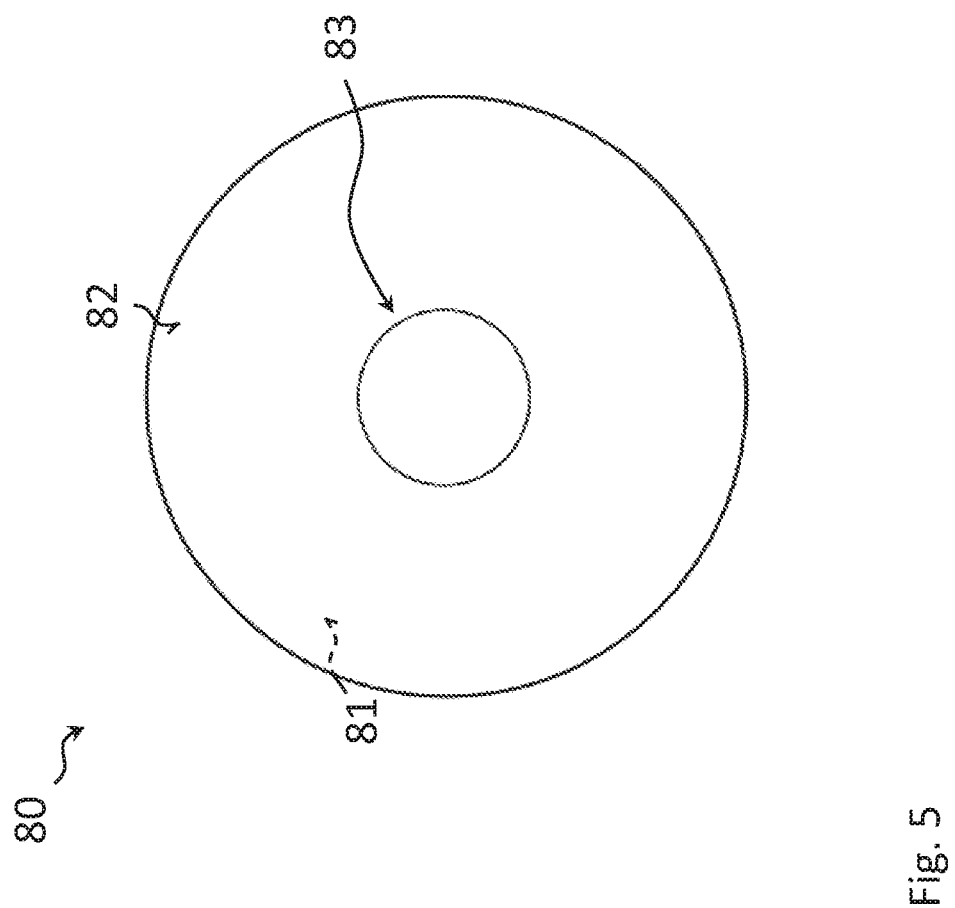

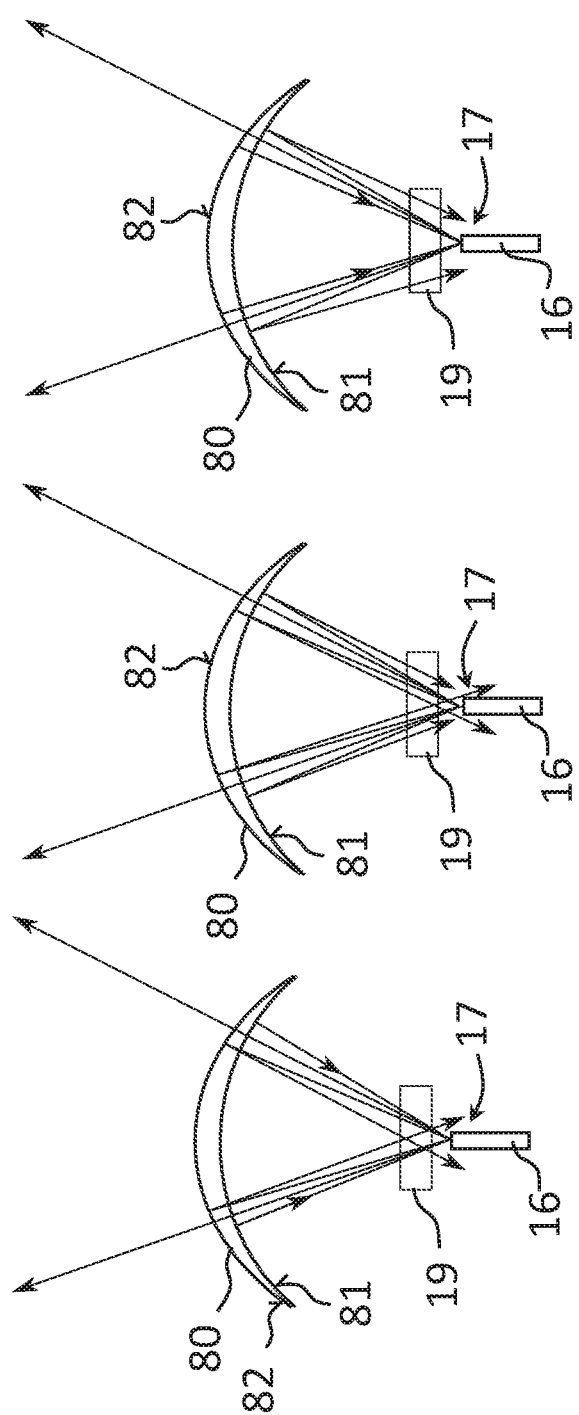

METHOD AND DEVICE FOR THE CONTROLLED MACHINING OF A WORKPIECE

CROSS-REFERENCE TO RELATED APPLICATION

This application claims the benefit of German Patent Application No. DE 10 2019 116 309.9, filed on Jun. 14, 2019, which is hereby specifically incorporated by reference herein in its entirety.

TECHNICAL FIELD

This disclosure relates to a method and to a device for the laser machining of a workpiece. This disclosure relates, in particular, to a method for the laser machining of a workpiece involving the control of the positioning of the workpiece to be machined in order to ensure the precise laser machining of the workpiece.

BACKGROUND

Methods are known in which workpieces are machined using a laser beam or laser light beam. Devices for carrying out such methods are also known. To ensure the precise machining of a workpiece using a laser beam it is necessary to position the workpiece accurately or to adjust the corresponding laser machining devices accurately. This is possible to a limited extent only with the known methods and known devices.

SUMMARY

One object of embodiments in this disclosure is to provide an improved method and an improved device for the controlled laser machining of workpieces that is characterized by a high degree of machining precision and by the simple construction of the device.

To achieve this object, according to a first aspect, a method is provided for the controlled machining of a workpiece. The method comprises the focusing of a laser beam or machining light beam in order to generate a laser focusing point on a target point of the workpiece to be machined by means of a laser target optics. In particular, a solid-state laser emitting in the near-infrared spectral range, such as a YAG laser or fiber laser, or a gas laser, e.g. a $CO_2$ laser, can be used to generate the laser beam.

The laser target optics can, in particular, be designed as a focusing and alignment lens system that allows the laser beam to be aligned and focused precisely. The laser target optics can, in particular, be designed as a laser beam scanner, specifically as a galvo scanner, it being possible to align the laser beam using electrically actuated mirrors.

The method comprises the gathering of distance measuring data by means of an optical distance measuring device or an optical sensor in order to determine a distance between the target point on the workpiece to be machined and the laser target optics or a fixed reference point on or reference plane of the laser target optics.

The method further comprises the machining of the target point on the workpiece to be machined using the focused laser beam. The machining can comprise, in particular, laser welding, laser cutting and/or another laser machining process.

According to the method, the distance measuring device is designed as a confocal optical distance measuring device having a variable-focal-length lens system or a variable-focal-length measuring lens system, the method comprising the variation over time of the focal length of the variable-focal-length measuring lens system in order to gather distance measuring data at different focal length values of the variable-focal-length measuring lens system.

By varying the focal length of the variable-focal-length measuring lens system over time, it is possible to vary the focal length of the variable-focal-length measuring lens system between a minimum focal length and a maximum focal length so as to define a desired measuring range. In particular, the measuring range can be defined or specified such that it is possible to determine precisely the distance between the laser target optics and the target point on the workpiece to be machined with the confocal optical sensor even with laser machining devices having a large focal length or a small numerical aperture. The workpiece can be machined in a controlled and precise manner using the distance measuring data determined.

It is also possible using the variable-focal-length measuring lens system to carry out distance measurements with optical elements that exhibit no or only minor optical dispersion such that the optical elements provided to guide the laser beam, which exhibit in particular no or low optical dispersion, can also be used to guide the beam of the measuring light.

The method can also comprise the positioning of the workpiece to be machined in relation to the laser focus point based on the distance measuring data gathered. The positioning of the workpiece to be machined can comprise a change in the spatial position and/or the spatial alignment of the workpiece or of the entire laser machining device.

Alternatively or additionally, the positioning can comprise the re-focusing of the laser beam. If necessary, it is therefore possible to reposition the workpiece to be machined or to readjust the laser in order to allow the precise machining of the workpiece to be machined.

The laser target optics of the laser machining device can form a part of the measuring lens system of the distance measuring device. In particular, the measuring light can be coupled into the beam path of the laser light beam such that in certain sections at least the measuring light beam runs coaxially with the laser light beam.

By using the laser target optics of the laser machining device for the measuring lens system of the distance measuring device it is possible to reduce the number of optical components required to carry out the method and so to simplify the optical set-up. It is also possible to integrate simply a distance sensor, in particular into an existing laser machining system.

At least some of the steps of the method can be carried out or repeated at a plurality of target points on the workpiece to be machined. By repeating the steps of the method at a plurality of points it is possible to recheck and, where necessary, correct the positioning of the workpiece to be machined.

In some embodiments the gathering of distance measuring data comprises the gathering of the intensity of a measuring light reflected back by the workpiece, the distance being determined using a time curve of the intensity of the measuring light reflected back by the workpiece.

In the case of the controlled variation over time of the focal length of the variable-focal-length measuring lens system in particular, it is possible to assign the times at which intensity is gathered to specific focal lengths of the variable-focal-length measuring lens system and so to positions of the measuring light focus point, from which it is then possible to deduce the distance between the laser target optics and the target point. For the intensity maximum occurs when the focal plane of the measuring light coincides with the surface of the workpiece to be machined or the measurement object. In such a case the measuring light spot generated on the surface of the workpiece to be machined is imaged due to the confocal light guidance of the distance measuring device on a diaphragm or light-coupling point arranged on the photodetector side, which also acts as a light-exit diaphragm for the measuring light source, and an intensity maximum is thus detected by the photodetector.

A broadband infrared light, in particular a near-infrared light, can be used as the measuring light. In particular, a near-infrared LED (Light-Emitting Diode) having a peak wavelength of between 900 nm and 1000 nm, in particular between 940 nm and 960 nm, and a spectral full width at half maximum of between 40 nm and 60 nm, in particular between 45 nm and 55 nm, can be used to generate the measuring light.

An LED measuring light of this kind is sufficiently broadband to avoid or reduce disruptive interference and speckle effects. On the other hand, an LED measuring light of this kind is sufficiently narrowband to suppress or minimize undesirable dispersion effects such as chromatic focus shift.

In addition, it is possible for distance measurement with a near-infrared measuring light to use the optical components of the laser machining device, e.g. mirrors and/or lenses of the laser target optics, that are designed for the near-infrared spectral range.

The variation over time of the focal length of the variable-focal-length measuring lens system can comprise the tuning, in particular the cyclical tuning, of the focal length of the variable-focal-length measuring lens system in order to gather distance measuring data at different focal lengths of the variable-focal-length measuring lens system. When tuning the focal length, a focal length range of the variable-focal-length measuring lens system between a minimum focal length and a maximum focal length is covered such that the focus point of the measuring lens system scans the entire measuring range of the optical sensor. Due to the cyclical tuning of the focal length of the variable-focal-length measuring lens system it is possible to synchronize the evaluation of the distance measuring data gathered with the variation over time of the focal length so as to facilitate the clear and reliable assignment of the measuring data gathered to the distances to be determined. In particular, it is possible to determine a, in particular a single, distance value or distance to the surface of the measurement object to be machined in one cycle or one measuring cycle using the variation in the focal distance of the measuring light.

In some embodiments the measuring beam focus lies on the surface of the measurement object or workpiece to be machined at two different times within a cycle such that the reflex from the measuring light spot on the surface of the workpiece to be machined is imaged sharply on the fiber end or the light-coupling point, resulting in an intensity maximum at the light gathered by the photodetector. Using the times at which intensity maxima of the light gathered by the photodetector are observed, the distance to the workpiece to be machined can be determined by means of a relationship between cycle points and positions of the focus point of the measuring light that is either known in advance or can be determined by means of calibration measurements.

The method can further comprise the performance of a calibration measurement in order to determine a relationship between cycle point and distance. The relationship between cycle point and distance determined by the calibration measurement can improve the reliability and the accuracy of the evaluation of the distance measuring data such that it is possible to calculate the distance to be determined clearly and reliably from the time of maximum intensity in a cycle.

The calibration measurement can comprise the gathering of reflexes of a meniscus lens arranged downstream of the variable-focal-length lens system, in particular at different times in a cycle. The meniscus lens has one concave surface and one convex surface. The meniscus lens can, in particular, be arranged such that when tuning the variable-focal-length lens system the light reflected back by the concave surface and the light reflected back by the convex surface are concentrated alternately on a light-coupling point, causing a measurable intensity peak of the light fed into the optical fiber. The time positions of this peak within a tuning cycle correspond well-defined focal lengths of the variable-focal-length lens system such that the variable-focal-length lens system or the distance measuring device can be calibrated precisely using the time positions of this intensity peak or calibration peak.

In some embodiments the calibration measurement comprises a measurement of a two-dimensional grid of lateral positions of the scanner or laser target optics. Distance measuring data gathered in the two-dimensional grid can then be used to calibrate the distance measuring device.

The gathering of the distance measuring data can take place at a plurality of points or measuring points at the target point. In this context, the arrangement of a measuring point at the target point means that the measuring point can be arranged at on or around the target point. By gathering the distance measuring data at a plurality of measuring points at the target point it is possible to reduce the susceptibility of the measurements to error by means of averaging. By gathering the distance measuring data at a plurality of measuring points it is also possible to reduce the influence of speckles on the measurement results. For the local intensity fluctuations of the light reflected back by the workpiece to be machined caused by the speckles can be averaged out by taking measurements at a plurality of measuring points.

The gathering of the distance measuring data at a plurality of measuring points can take place sequentially or one after another, in particular within a measuring cycle. During a measuring cycle it is therefore possible to collect distance measuring data from different measuring points in order to be able to determine an averaged distance quickly and with little computing effort.

In some embodiments the distance measuring data is gathered at a plurality of points along a scan path at the target point. The scan path can, in particular, be selected such that the target point distance can be deduced from the distance measuring data gathered along the scan path.

The scan path can take the form of a circle surrounding the target point on the workpiece to be machined. In particular, the measuring circle can have an orbit radius comparable to the laser spot. The distance measuring data gathered along the measuring circle yield a database that allows an efficient reduction in measurement error by means of averaging.

The scan path can take the form of a spiral centered at the target point of the workpiece to be machined. In particular, the center point of the spiral can coincide with the target point. Due to the helical scan path it is possible to gather the distance measuring data from a particularly large surface area, making it possible to strengthen the averaging effect and reduce the susceptibility of the measurement to disruption.

In some embodiments the distance measuring data is gathered at a plurality of measuring points essentially simultaneously, in particular within one measuring cycle, the distance being determined using physically averaged distance measuring data.

The physical averaging of the distance measuring data means, in particular, that the distance is not determined separately for each measuring point in order, for example, to form an average distance from the distances gathered. Physical averaging means that the totality of the distance measuring data gathered at the plurality of measuring points at the target point, in particular intensity measuring data of the measuring light reflected back by the workpiece to be machined, are included in the determination of the distance to the target point such that one single distance value is determined for the totality of the measuring points.

Owing to the physical averaging, the entirety of the distance measuring data gathered at the different measuring points on a target point can be evaluated together, in particular in a single evaluation step, such that the distance value can be determined simply and quickly.

The measuring light can be split by means of at least one shadow mask having a plurality of holes, in particular one designed as a confocal diaphragm, into a plurality of partial measuring lights in order to gather the distance measuring data simultaneously at a plurality of measuring points. With the at least one shadow mask it is therefore possible to generate the partial measuring lights required to gather the distance measuring data at a plurality of measuring points in a simple manner.

The partial measuring lights can be gathered using a common photodetector. The use of the common photodetector for all partial measuring lights simplifies the gathering of distance measuring data from the plurality of measuring points. Physical averaging of the distance measuring data or light intensities is carried out simultaneously with the gathering of the partial measuring lights by the common photodetector since the common photodetector does not distinguish the lights reflected back by the different measuring points. The distance measuring data is therefore averaged automatically without the need to carry out a computational step.

According to a second aspect, a device is proposed for the controlled machining of a workpiece.

The device comprises a laser light source for the generation of a laser light beam for machining or laser machining the workpiece to be machined. In particular, a solid-state laser emitting in the near-infrared spectral range, such as a YAG laser or a fiber laser, or a gas laser, e.g. a $CO_2$ laser, can be used to generate the laser beam.

The device further comprises a laser target optics for focusing the laser light beam on a laser light focus point on a target point of the workpiece to be machined. The laser target optics can, in particular, be designed as a focusing and alignment lens system that enables the laser beam to be aligned and focused precisely. The laser target optics can, in particular, be designed as a laser beam scanner, specifically as a galvo scanner, it being possible to align the laser beam using electrically actuated mirrors.

The device also comprises a distance measuring device for determining a distance between the target point on the workpiece to be machined and the laser target optics using distance measuring data gathered by the distance measuring device and a positioning device for positioning the workpiece to be machined in relation to the laser light focus point and/or re-focusing laser based on the distance measuring data gathered.

The device further comprises an evaluation and control unit that is designed to evaluate the distance measuring data gathered and to actuate the positioning device based on the distance measuring data gathered.

The distance measuring device is designed as a confocal optical distance measuring device having a measuring light source for the generation of a measuring light and having a variable-focal-length measuring lens system such that the focal length of the variable-focal-length measuring lens system can be varied over time in order to gather distance measuring data at different focal length values of the variable-focal-length measuring lens system.

By varying the focal length of the variable-focal-length measuring lens system over time it is possible to achieve an increase in the effective measuring range of the distance measuring device such that it is possible to determine precisely the distance between the laser target optics and the target point on the workpiece to be machined with the confocal optical sensor even with laser machining devices having a large focal length or a small numerical aperture.

The variable-focal-length measuring lens system also allows distance measurements to be carried out with optical elements with or without low optical dispersion such that the optical elements required for laser beam guidance, which have, in particular, no or low optical dispersion, can also be used for the beam guidance of the measuring light.

The measuring lens system of the distance measuring device can comprise at least a part of the laser target optics.

By using the laser target optics for the measuring lens system of the distance measuring device it is possible to reduce the number of optical components required or to significantly simplify the construction of the device. Consequently it is also possible to integrate a distance sensor into an existing laser machining system in a simple manner.

The distance measuring device can comprise a photodetector for gathering the intensity of a measuring light reflected back by the workpiece to be machined and be designed such that it is possible to determine the distance using a time curve of the gathered intensity of the measuring light reflected back by the workpiece 4.

In the case of the controlled variation of the focal length of the variable-focal-length measuring lens system over time in particular, it is possible to assign the intensity gathering times to specific focal lengths of the variable-focal-length measuring lens system and thus to specific distances and so to deduce the distance between the laser target optics and the target point.

A broadband infrared light source, in particular a light source emitting in the near-infrared spectral range, can be used as the measuring light source. In particular, a near-infrared LED with a peak wave length of approx. 950 nm and a spectral full width at half maximum of approx. 50 nm can be used to generate the measuring light. An LED measuring light of this kind is sufficiently broadband to prevent or reduce disruptive interference and speckle effects. In contrast, an LED measuring light of this kind is sufficiently narrowband to suppress or minimize undesirable dispersion effects such as chromatic focus shifts.

The variable-focal-length measuring lens system can be designed as a tunable, in particular a cyclically tunable, measuring lens system. When tuning the focal length a focal length range of the variable-focal-length measuring lens system between a minimum focal length and a maximum focal length is covered such that the focus point of the measuring lens system covers the entire measuring range of the optical sensor, e.g. +/−7 mm. By cyclically tuning the focal length of the variable-focal-length measuring lens system it is possible to synchronize the evaluation with the variation over time of the focal length so as to allow the clear and reliable assignment of the measuring data gathered to the distances determined.

The variable-focal-length lens system can, in particular, be arranged in a diverging part of an imaging system of the distance measuring device. A diverging part means a part of the imaging system of the distance measuring device in which the measuring lens system forms a diverging measuring beam. In the diverging part of the imaging system it is possible to position the variable-focal-length measuring lens system, in particular, so as to allow optimum exploitation of the clear aperture of the variable-focal-length lens system.

The variable-focal-length measuring lens system can comprise a variable-focal-length lens. With a variable-focal-length lens, in particular with an electrically actuated variable-focal-length lens, it is possible to vary the focal length of the measuring lens system in a simple manner. The clear aperture of the variable-focal-length lens can have a diameter in a range of 1 to 10 mm, in particular 2 to 6 mm. The variable-focal-length lens can, in particular, be arranged in proximity to a light-coupling point or in proximity to a fiber end from which the measuring light exits divergently.

In some embodiments the device comprises at least one shadow mask having a plurality of holes for splitting the measuring light into a plurality of partial measuring lights. With the partial measuring lights it is possible to gather the distance measuring data at a plurality of measuring points simultaneously.

In some embodiments the device comprises an optical fiber having a light-coupling point for coupling in and out the measuring light, the at least one shadow mask being arranged at the light-coupling point. This arrangement of the shadow mask is suitable for devices with a fiber coupler, the light-coupling point being designed both to couple out the light generated by the measuring light source and to couple in the measuring light reflected back by the workpiece to be machined. In this case, the distance measuring data can be gathered simply at different measuring points with one single shadow mask.

In particular, the shadow mask can be placed directly on the light-coupling point or on the end of the optical fiber. The arrangement of the shadow mask on the light-coupling point allows the efficient use of the shadow mask as essentially the entirety of the measuring light emitted from the light-coupling point is gathered by the shadow mask.

The light-coupling point or the end of the optical fiber and the shadow mask can be dimensioned such that the shadow mask is essentially completely illuminated. This allows the surface of the shadow to be used particularly efficiently.

In some embodiments the device has a first optical fiber with a light-exit end and a second optical fiber with a light-entry end, a first shadow mask being arranged at the light-exit end and a second shadow mask being arranged at the light-entry end. This arrangement of the shadow masks is suitable for devices with a beam splitter, which are designed to couple the measuring light generated by the measuring light source into the imaging system of the distance measuring device and to couple out the measuring light reflected back by the workpiece to be machined.

The two shadow masks can be positioned such that the holes in the two shadow masks are aligned in pairs confocally in relation to one another. Aligning the pairs of holes in the two shadow masks confocally in relation to one another concentrates the partial measuring light beams generated by the holes in the first shadow mask into the corresponding holes in the second shadow mask so as to minimize the light losses caused by the shadow masks.

Instead of individual optical fibers it is possible to use bundles of optical fibers to generate a multiplicity of partial measuring lights for gathering the distance measuring data at different measuring points. In such arrangements the optical fiber bundles supply a multiplicity of partial measuring lights and the shadow masks are therefore no longer required. The optical fiber bundles for splitting the measuring light into partial measuring lights can be used both in the device having the fiber coupler and in the device having the beam splitter. The use of optical fiber bundles makes it possible to simplify the construction and use of the device.

In some embodiments the device has a camera that is designed such that it is possible to control visually the machining location on the workpiece to be machined using the camera before, during and/or after machining

BRIEF DESCRIPTION OF THE DRAWINGS

The embodiments are described in greater detail below with reference to the drawings in which identical reference numerals are used to denote the same or comparable components.

FIG. 5 shows a schematic top view of the meniscus lens in FIG. 4.

FIG. 6 shows in schematic form a possible beam path in a section of the distance measuring device according to one embodiment.

FIG. 7 shows in schematic form another possible beam path in the section shown in FIG. 6.

FIG. 8 shows in schematic form a further possible beam path in the section shown in FIG. 6.

DETAILED DESCRIPTION

Figure 1:
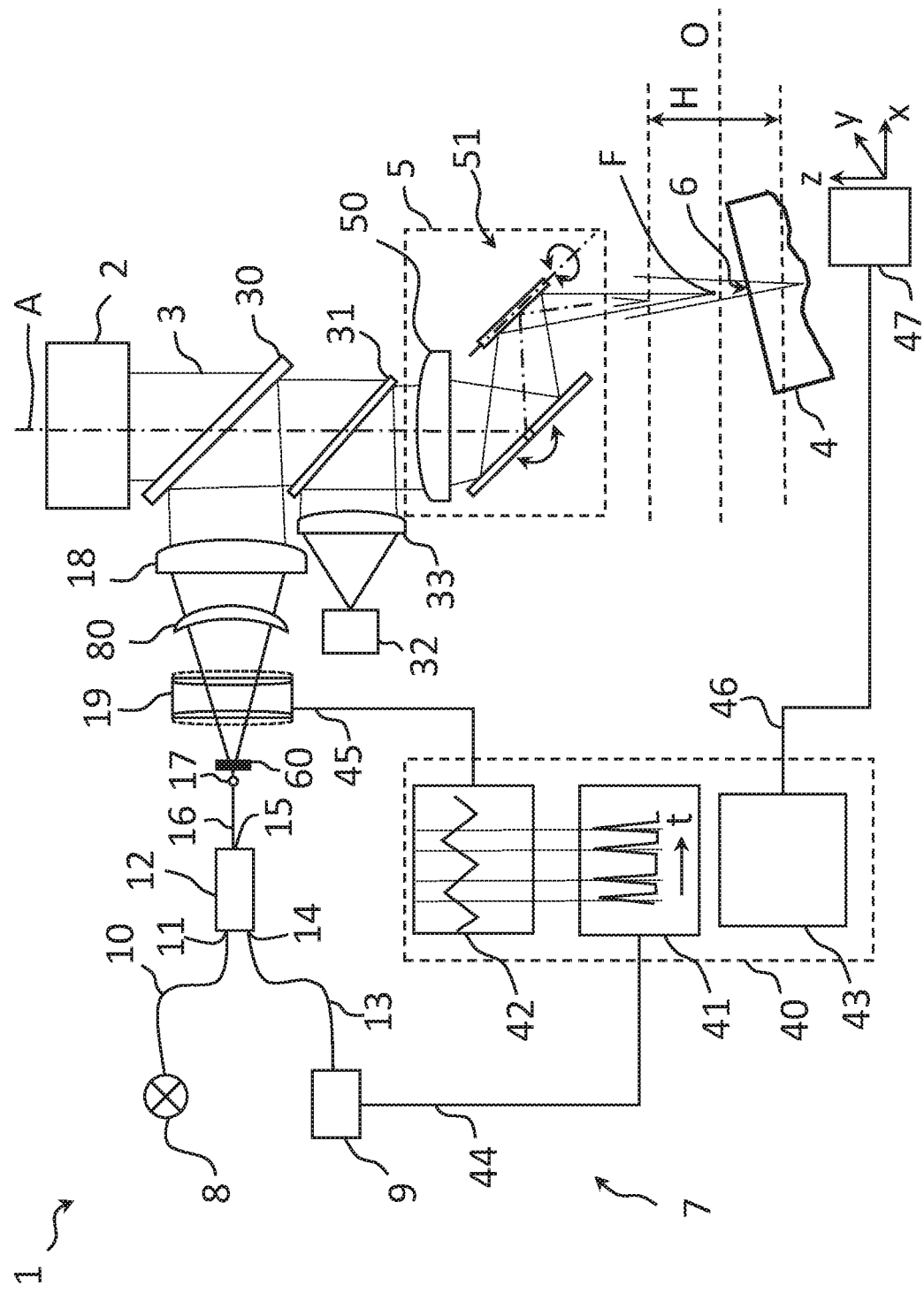
FIG. 1 shows in schematic form a device for the controlled machining of a workpiece according to one embodiment.

FIG. 1 shows in schematic form a device for the controlled machining of a workpiece according to one embodiment. The device 1 comprises a laser light source 2 for generating a laser light beams 3 for the machining of the workpiece 4 to be machined. Furthermore, the device 1 comprises a laser target optics 5 for aiming or precisely focusing the laser light beam 3 at a focus point F on a target point 6 of the workpiece 4 to be machined.

The device 1 comprises a distance measuring device 7 for determining a distance between the target point 6 of the workpiece 4 to be machined and the laser target optics 5. The distance measuring device 7 is designed as a confocal optical distance measuring device and comprises a measuring light source 8 for generating a measuring light and a photodetector 9 for gathering a measuring light reflected back by the workpiece 4. In this embodiment the distance measuring device 7 has a distance measuring range H of +/−7 mm about a zero plane O.

The measuring light source 8 is connected to a first optical fiber 10 at a first connection point 11 of a fiber coupler 12 designed in the form of a Y coupler. The photodetector 9 is connected to a second optical fiber 13 at a second connection point 14 of the fiber coupler 12. A third optical fiber 16 is connected to a first end at a third connection point 15 of the fiber coupler 12, the second end of the third optical fiber 16 being designed as a light-coupling point 17 for coupling the measuring light in and out. In this embodiment the first optical fiber 10, the second optical fiber 13 and the third optical fiber 16 are designed as multi-mode fibers capable of transmitting a broadband light in the near-infrared spectral range.

A collimation lens 18 is arranged downstream of the light-coupling point 17, a variable-focal-length lens 19 being arranged between the light-coupling point 17 and the collimation lens 18. The light-coupling point 17 is designed such that the measuring light exits divergingly from the light-coupling point 17, thereby producing a diverging measuring light beam in the region between the light-coupling point 17 and the collimation lens 18. In this embodiment the variable-focal-length lens 19 is an EL-03-10 electrically actuated variable-focal-length from Optotune.

Arranged in the beam path of the laser light beam 3 is a first deflection late 30 for coupling the measuring light into and out of the beam path of the laser light beam 3 or the laser target optics 5. The deflection plate 30 can be designed such that the measuring light is able to propagate in the beam path of the laser light beam coaxially with the laser light beam 3, in particular along an optical axis A common to the measuring light and the laser light beam.

The device 1 further has a second deflection plate 31 that is positioned in the beam path of the laser light beam between the first deflection plate 30 and the laser target optics 5. A camera 32 is optically connected via a second collimation lens 33 and the second deflection plate 31 to the laser target optics 5 such that it is possible to control visually the machining location on the workpiece to be machined using the camera 32. The deflection plates 30 and 31 are designed as laser-light-permeable or partially laser-light-permeable plates such that the beam path of the laser light beam is not or is only slightly disrupted by the deflection plates 30 and 31.

In some embodiments the light for the camera 32 is diverted between the laser 2 and the deflection plate 30 by the deflection plate 31. The diversion of the camera light between the laser and the deflection plate 30 does not impair the distance measurement by the deflection plate 31 for the diversion of the camera light.

In the arrangement shown in FIG. 1 the laser light beam 3 is coupled by deflection plate 30 or deflection plate 31 and thus transmissively into the laser target optics 5. In alternative embodiments the laser light beam 3 is coupled to the laser target optics 5 reflectively or by means of a laser beam mirror.

In particular, the laser beam can be coupled reflectively into the optical system of the device 1 laterally or vertically in relation to the common optical axis A. In an arrangement of this kind the laser 2 would be arranged in the place of the camera 32 and the collimation lens 33, for example, and a laser beam mirror would be arranged in the place of the deflection plate 31. Any laser beam mirror that it at least partially permeable for the measuring light can be used as the laser beam mirror. Other configurations of the light beam path in which the principles described here can be implemented are also possible. In one non-limiting embodiment the measuring light is coupled into the beam path of the laser beam coaxially or along the common optical axis A.

In some embodiments of the laser target optics 5 the focusing lens 50 is arranged downstream of the mirror pair 51 such that the laser beam 3 is first aligned by the mirror pair 51, after which the aligned laser beam 3 can be focused at the target point by the focusing lens 50.

The device 1 according to the embodiment in FIG. 1 also has an evaluation and control unit 40. The evaluation and control unit 40 comprises an evaluation unit 41 for evaluating the distance measuring data gathered, a lens control unit 42 for controlling the focal length of the variable-focal-length lens 19 and a positioning control unit 43 for positioning the workpiece to be machined in relation to the laser focus point. The evaluation unit 41 is connected via a signal line 44 to an outlet of the photodetector 9. The lens control unit 42 is connected via a lens control line 45 to a control connection of the variable-focal-length lens 19. The positioning unit 43 is connected via a positioning control line 46 to a positioner 47 for positioning the workpiece 4 to be machined.

In this embodiment a YAG laser that generates an optical radiation in a wavelength range of 1030 nm to 1070 nm is used as the laser light source. Other lasers, in particular solid-state lasers emitting in the near-infrared spectral range, and gas lasers, e.g. CO2 lasers, can also be used as the laser light source. Lasers emitting in the near-infrared spectral range are well suited to material machining because these lasers are capable of providing the kW range outputs and the high optical radiation output densities required for material machining. The device 1 further comprises a laser output control system designed to control the output of the laser 2 and a laser focusing control system with a controllable focusing lens that is arranged in the beam path of the laser and designed to control laser focusing. In the interests of simplicity, the laser output control system and the laser focusing control system are not illustrated in the representation given in FIG. 1.

In this embodiment a broadband near-infrared LED with a peak wave length of approx. 950 nm and a spectral full width at half maximum of approx. 50 nm is used as the measuring light source. An LED-measuring light of this kind is sufficiently broadband to prevent or reduce disruptive interference and speckle effects. In contrast, an LED measuring light of this kind is sufficiently narrowband to suppress or minimize undesirable dispersion effects such as chromatic focus shift.

In the embodiment in FIG. 1 the laser target optics 5 or scanner comprises a focusing lens 50 and a controllable mirror pair 51 for aligning the focused radiation with the target point 6 of the workpiece 4 to be machined and, where necessary, for passing with the focused laser beam over a machining area of the workpiece 4 to be machined. The mirror pair 51 can, in particular, take the form of a galvo mirror pair that can be electrically actuated by simple means.

The focusing lens 50 has a focal length of approx. 180 mm. The diameter of the laser beam 3 before entry into the laser target optics 5 is approx. 10 mm. The laser target optics 5 is dimensioned such that the laser beam 3 is able to process a machining area of approx. 80 mm×80 mm.

In some embodiments the laser target optics 5 takes the form of a telecentric laser target optics. Owing to the telecentric design of the laser target optics, the workpiece 4 to be processed can be machined with the laser beam at different distances from the device.

The positioner 47 can, in particular, be designed to position and/or align the workpiece 4 to be machined in relation to the laser beam focus point and can, in particular, comprise one or more actuators with one or more control signals from the positioning control unit 46 for positioning or aligning the workpiece 4 to be machined. The potential for aligning the workpiece is illustrated symbolically in FIG. 1 by means of coordinate axes.

In some embodiments, as in the example illustrated in FIG. 1, the device 1 has a shadow mask 60 or diaphragm arranged in the beam path of the distance measuring device 7. The shadow mask 60 has a plurality of holes 61 that are clearly visible at the bottom of FIGS. 2 and 3. The shadow mask 60 is positioned between the light-coupling point 17 and the variable-focal-length lens 19 such that the measuring light is split into a plurality of parts by the shadow mask 60 so as to be able to gather distance measuring data simultaneously at a plurality of points on the surface of the workpiece 4 to be machined. In the embodiment shown in FIG. 1 the shadow mask is placed directly on the fiber end acting as the light-coupling point 17 such that the fiber end also serves as a holder for the shadow mask 60.

In some embodiments the optical fiber on the end of which the shadow mask is placed has a diameter sufficient to illuminate the shadow mask 60 essentially completely and to capture the reflected light via essentially all the holes 61 in the shadow mask 60.

In some embodiments a fiber bundle coupled to a fiber couple in a manner similar to the fiber 16 in FIG. 1 is used instead of the fiber 16 with the shadow mask 60.

In some embodiments, as in the example illustrated in FIG. 1, the device 1 has a meniscus lens 80 positioned between the variable-focal-length lens 19 and the collimation lens 18 for the controlled machining of a workpiece.

The meniscus lens 80 has an essentially spherical concave surface 81 and an essential spherical convex surface 82. The concave surface 81 or concave side of the meniscus lens 80 faces the variable-focal-length lens 19 and the convex surface 82 or convex side of the meniscus lens 80 faces the collimation lens 18. In the embodiment shown the meniscus lens 80 has a circular hole 83 in the center.

When the device 1 is in operation, a part of the light generated in the measuring light source 8 passes through the first optical fiber 10 via the fiber coupler 12 and through the third optical fiber 16 to the light-coupling point 17. The measuring light exits the light-coupling point 17 divergently and then passes through the variable-focal-length lens 19 and the collimation lens 18 before being coupled into the beam path of the laser light beam 3 by the deflection plate 30. The measuring light coupled into the beam path of the laser light beam 3 is then able to pass through the laser target optics 5 to the workpiece 4 to be machined.

When the measuring light hits the workpiece 4 a part of the measuring light can be reflected back and enter the third optical fiber 16 via the laser target optics 5, the collimation lens 18, the variable-focal-length lens 19 and the light-coupling point 17. In the process, a part of the measuring light is diverted via the second fiber 13 to the photodetector 9 at the fiber coupler 12. The photodetector 9 supplies a measuring signal via the signal line 44 to the evaluation unit 41 for evaluation. The evaluation unit 41 is designed to evaluate a time curve of the intensity of the light gathered by the photodetector 9. The evaluation unit 41 is further designed to deduce distances between the target point on the workpiece to be machined and the laser target optics from the intensity time curve.

The variable-focal-length lens 19 can, in particular, be controlled cyclically such that the optical power of the variable-focal-length lens is tuned by, for example, +/−13 dioptres, the focus point of the measuring light being shifted by approx. +/−7 mm along the optical axis. The measuring beam focus lies on the surface of the measurement object or the workpiece to be machined at two different times during the cycle such that the reflex from the measuring light spot on the surface of the workpiece to be machined is imaged sharply on the fiber end or the light-coupling point 17, resulting in an intensity maximum of the light gathered by the photodetector.

Using the times at which intensity maxima of the light gathered by the photodetector are observed, it is possible to determine the distance to the workpiece to be machined from a relationship between cycle points and measuring light focus point positions that is either previously known or can be determined by means of calibration measurements.

In particular, it is possible to carry out the calibration measurement designed to determine the relationship between cycle point and distance from the surface of the workpiece to be machined in advance or prior to laser machining. The calibration measurement can be carried out using a two-dimensional grid of lateral positions of the scanner or the laser target optics. Using the relationship thus determined, it is then possible to determine the distance to the surface or the distance between the laser target optics 5 and the target point 6 on the workpiece to be machined from the time of the intensity maximum in the cycle.

The cyclical variation or modulation of the focal length of the variable-focal-length lens 19 is illustrated symbolically in FIG. 1 by the saw-toothed curve in the lens control unit 42. The relationship between the cycles of the focal length variation of the variable-focal-length lens 19 and the occurrence of the intensity maxima is illustrated schematically in FIG. 1 by dashed lines that extend between the saw-tooth curve of the lens control unit 42 and an intensity curve with the time coordinate t illustrated in the evaluation unit 41.

The measuring light split by the shadow mask 60 makes possible the simultaneous gathering of distance measuring data at a plurality of points on the surface of the workpiece 4 to be machined. In particular, the measuring light reflected back by the workpiece also passes through the holes 61 in the shadow mask 60 via the coupling point 17 into the fiber 16 such that it can be gathered by the photodetector 9. Here the light intensity gathered by the photodetector 9 corresponds to the total intensity of the light reflected back by all the measuring points collected via all the holes 61 in the shadow mask 60 such that a physical averaging of the intensity differences between the light reflected back by the different points takes place due to the optical arrangement. The physical averaging of the light intensities gathered via the different holes 61 of the shadow mask 60 can considerably simplify the evaluation of the measuring data since distance averaging does not have to be carried individually for each point. In fact, distance averaging can be carried out using the physically averaged distance measuring data, in particular intensity data, for all the points generated by the shadow mask 60.

Due to the arrangement of the meniscus lens 80 the light reflected back by the surfaces 81 and 82 of the meniscus lens 80 can pass via the light-coupling point 17 into the fiber 16 and be gathered by the photodetector 9.

When the light beams exiting the variable-focal-length lens 19 hit one of the two surfaces 81 and 82 of the meniscus lens 80 vertically in particular, a maximum portion of the light from the corresponding surface 81 or 82 of the meniscus lens 80 is reflected back into the fiber 16 again by the variable-focal-length lens 19. A beam configuration of this kind can thus be detected by a corresponding intensity peak of the light reflected back, each of the two surfaces 81 and 82 of the meniscus lens 80 being responsible for its own intensity peak.

In some embodiments the meniscus lens is dimensioned such that the peaks occur at the start or at the end of a repeated time cycle during the tuning of the variable-focal-length lens 19. Here the position of each of the two peaks always corresponds to a constant value of the focal length of the focal-length-variable lens 19 and therefore always corresponds to the same distance. Under the influence of temperature changes the relationship between passage of time and distance value in particular is subject to change. The tunable lens has a significant influence and the assignment of actuation value to focal length of the variable-focal-length lens 19 can therefore change in case of temperature fluctuations. As the intensity peaks caused by the meniscus lens 80 occur at the same focal length of the variable-focal-length lens 19, it is possible to calibrate the variable-focal-length lens 19 or the relationship between passage of time and distance precisely using these peaks. For in contrast to the variable-focal-length lens 19, the temperature dependency of the meniscus lens 80 is negligible.

Due to the circular hole 83 in the center of the meniscus lens 80 the beams of measuring light pass through the meniscus lens uninterrupted and only the marginal rays can be reflected back by the meniscus lens 80. The intensity of the reflexes can be adjusted by selecting lens surface area and/or hole size such that the intensity of the light reflected back by the meniscus lens 80 is high enough to serve as a calibration signal but not so high that the measuring signal or intensity signal of the measuring light reflected back by the object to be machined is overshadowed by the reflexes of the meniscus lens.

In some embodiments the hole 83 is dimensioned such that the main part of the measuring light passes through the hole 83 in the meniscus lens 80 without reflection.

In some embodiments there is arranged downstream of the meniscus lens 80 a diaphragm that is set up to let the inner part of the beam of measuring light through and to cut out the outer part of the beam of measuring light. In this way it is possible to exclude from the measurement in particular those beams influenced by the meniscus lens 80.

In some embodiments the meniscus lens 80 has no hole, the meniscus lens 80 having a coating on at least one of its two surfaces 81, 82. The thickness and/or the reflectivity of the coating can be selected such that the measuring signal is not overshadowed by the reflected components of the meniscus lens. In some embodiments the meniscus lens 80 has an anti-reflective coating with a reflection component in a measuring light wavelength range of less than 4%.

In some embodiments the meniscus lens 80 has both the circular hole 83 and the coating, it being possible to select both the dimensions of the circular hole 83 and the thickness of the coating both so as to achieve a sufficiently strong calibration signal without overshadowing or overly impairing the measuring signal in the process.

Figure 2:
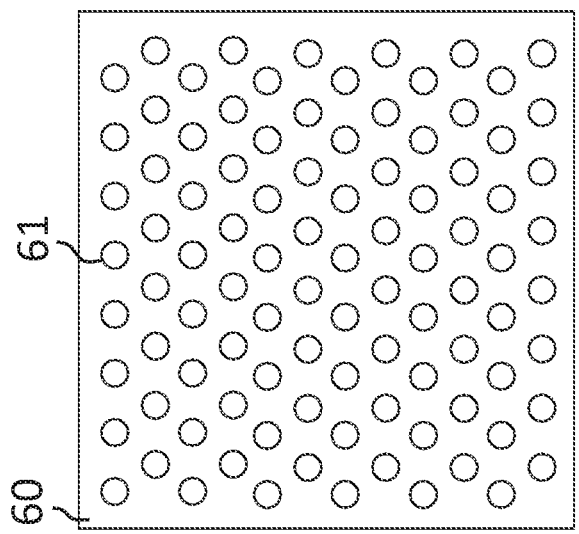
FIG. 2 shows a shadow mask according to one embodiment.

FIG. 2 shows a shadow mask according to one embodiment.

The shadow mask 60 in FIG. 2 takes the form of an essentially rectangular diaphragm and has a plurality of circular holes 61. In this embodiment the circular holes 61 are distributed essentially evenly over the entire surface of the diaphragm in a hexagonal grid. The distribution of the holes 61 in a hexagonal grid allows a high density of holes such that the measuring light can be split by the shadow mask into many parts in order to gather the distance measuring data at many measuring points. At the same time, the selection of a hexagonal grid at a given density results in a maximum distance between adjacent holes and thus minimal cross-talk between the holes.

Figure 3:
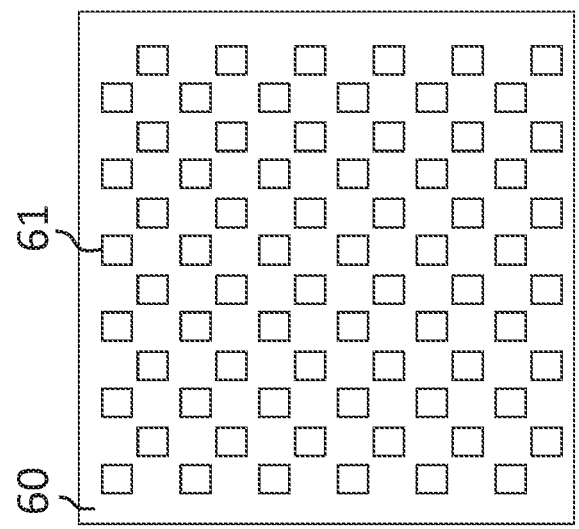
FIG. 3 shows a shadow mask according to another embodiment.

FIG. 3 shows s shadow mask according to another embodiment.

Like the shadow mask 60 in FIG. 2, the shadow mask 60 shown in FIG. 3 takes the form of an essentially rectangular diaphragm and has a plurality of holes 61. In contrast to the shadow mask 60 in FIG. 2, the holes 61 in the shadow mask in FIG. 3 are rectangular in shape and are distributed in a checkerboard pattern essentially evenly over the whole surface of the diaphragm.

The fill level of the shadow masks 60 shown in FIGS. 2 and 3 is preferably between 30% and 70%, in particular approximately 50%, such that approximately 50% of the light inciding on the shadow masks passes through the shadow masks.

Alternatively to the embodiments shown in FIGS. 2 and 3, the shadow mask can also be essentially circular in design. A circular shadow mask is particularly suitable for placing accurately on the end of an optical fiber with a circular cross-section.

Figure 4:
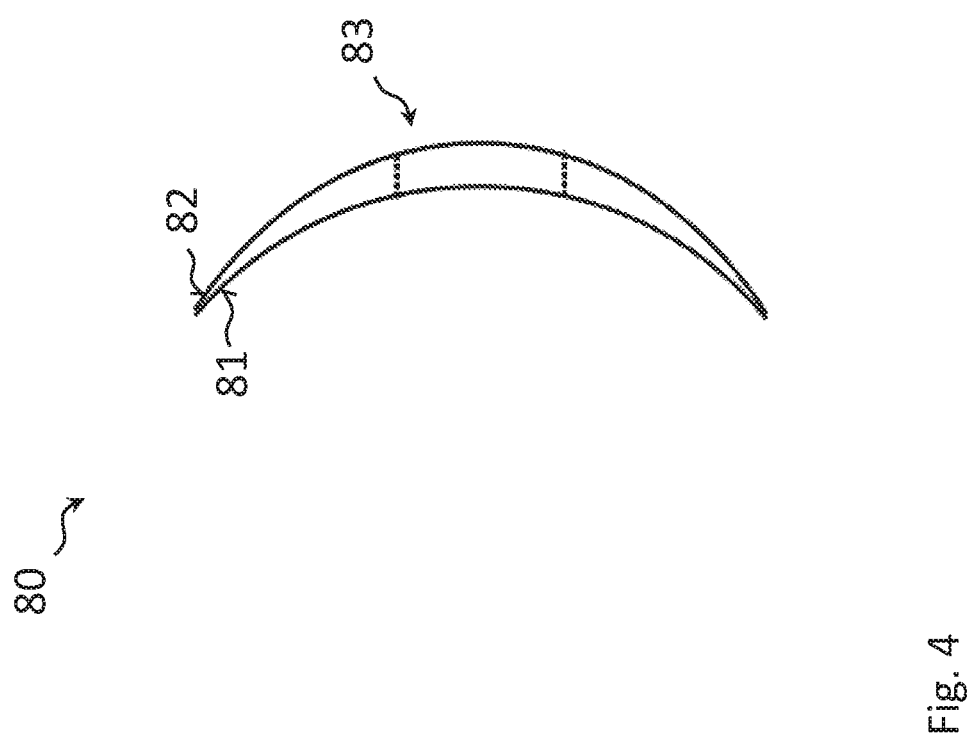
FIG. 4 shows a schematic side view of a meniscus lens according to one embodiment.

FIG. 4 shows a schematic side view of a meniscus lens according to one embodiment.

As can be clearly seen in the view in FIG. 4, the meniscus lens 80 has an essentially spherical concave surface 81 and an essentially spherical convex surface 82. In the embodiment shown the meniscus lens 80 has a circular hole 83 in the center.

FIG. 5 shows a schematic top view of the meniscus lens from FIG. 4.

The circular hole 83 of the meniscus lens 80 is particularly clearly visible in the top view in FIG. 5. As already detailed in the description of FIG. 1 above, the meniscus lens 80 can take different forms. In particular, at least one of the two surfaces 81, 82 can have a coating. In addition, the dimensions of the circular hole 83 and/or the strength or reflectivity of the coating can be selected such that the back reflections on the surfaces 81, 82 of the meniscus lens 80 produce calibration peaks of sufficient intensity without overshadowing the measuring signal or impairing the distance measurement.

FIG. 6 shows in schematic form a possible beam path a section of the distance measuring device according to one embodiment.

The section shown in FIG. 6 comprises the variable-focal-length lens 19, the meniscus lens 19 and the coupling point 17 of the optical fiber 13 according to FIG. 1.

The long arrows pointing away from the coupling point 17 represent the measuring light beam exiting the light-coupling point 17 that is projected through the variable-focal-length lens 19 and also in part through the meniscus lens 80. The arrows pointing from the meniscus lens 80 back to the light-coupling point 17 illustrate the beams reflected by the concave surface 81 and the convex surface 82. The beams reflected back are concentrated at the focus point as a result of the essentially spherical curvature of the surfaces 81 and 82.

In the case represented in FIG. 6 the light reflected by the concave surface 81 of the meniscus lens 80 is concentrated at the light-exit surface of the light-coupling point 17, while the focus point of the light reflected back by the convex surface 82 of the meniscus lens 80 lies above the light-entry surface or light-coupling point 17. The beam path show can, in particular, occur at a specific focal length of the variable-focal-length lens 19.

FIG. 7 shows in schematic form another possible beam path in the section represented in FIG. 6.

The beam path in FIG. 7 corresponds essentially to the beam path illustrated in FIG. 6. In contrast to the case shown in FIG. 6, the variable-focal-length lens 19 has a different focal length value, as a result of which neither of the two beams reflected back are concentrated at the light-coupling point 17.

FIG. 8 shows in schematic form a further possible beam path in the section represented in FIG. 6.

The beam path illustrated in FIG. 8 corresponds to a focal length of the variable-focal-length lens 19 when the light reflected back by the convex surface 82 of the meniscus lens 80 is concentrated at the light-exit surface of the light-coupling point 17, while the focus point of the light reflected back by the concave surface 81 of the meniscus lens 80 lies below that reflected back by the light-entry surface or light-coupling point 17.

The possible beam configurations of the measuring light shown in FIGS. 6, 7 and 8 illustrate how the meniscus lens 80 works. If the variable-focal-length lens 19 is tuned cyclically, for example, the focal length periodically runs through all values between a minimum focal length and a maximum focal length and the beam configurations illustrated in FIGS. 6, 7 and 8 can occur periodically in the process. If none of the beams reflected back by the meniscus lens 80 are concentrated at the light-coupling point 17, the beam path illustrated in FIG. 7 or a similar beam path can occur at a multiplicity of settings of the variable-focal-length lens 19. On the other hand, the beam configurations represented in FIGS. 6 and 8 can only occur at very specific values of the focal length of the variable-focal-length lens 19. Due to the concentration of the light reflected back by the surfaces 81 and 82 of the meniscus lens 80 at the light-coupling point 17 of the optical fiber 13, in the beam configurations shown in FIGS. 6 and 8 a greater portion of the light reflected back by the meniscus lens 80 is coupled into the light-coupling point than would otherwise be the case. This increase in the amount of light coupled in can be detected by a corresponding increase in the light intensity gathered by the photodetector. The corresponding intensity peaks can be gathered with a photodetector, for example with the photodetector 9 in the arrangement according to FIG. 1, and can be used as calibration peaks for calibrating the distance measuring device 7. In particular, it is possible to deduce the corresponding focal length of the variable-focal-length lens 19 or the corresponding measuring distance of the distance measuring device 7 using the position in time of each intensity peak.

The section illustrated in FIGS. 6, 7 and 8 has no shadow mask 60. The observations made above on the operation of the meniscus lens 60 with reference to FIGS. 6, 7 and 8 also apply accordingly if a shadow mask 60 is used to split the measuring light into a plurality of parts and to gather distance measurement data a different points that could, for example be arranged between the coupling point 17 and the variable-focal-length lens 19.

Figure 9:
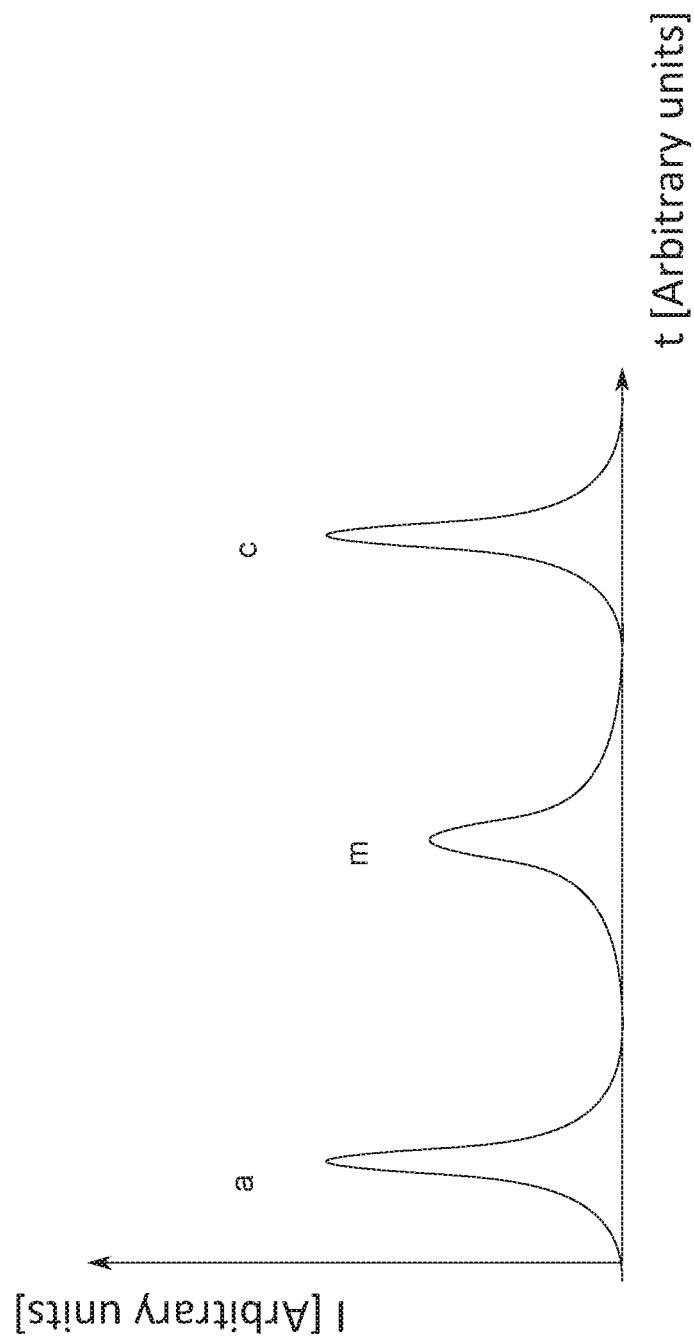
FIG. 9 shows a time curve for intensity of a light reflected back by a meniscus lens.

FIG. 9 shows a time curve of the intensity of a light reflected back by a meniscus lens.

In particular, FIG. 9 represents the time dependency of the light intensity measured in the arrangement illustrated in FIGS. 6, 7 and 8, the intensity of the portion of the light reflected back by the meniscus lens 80 and the workpiece 4 to be machined coupled into the optical fiber 16 being measured during a tuning cycle. Here a tuning cycle corresponds to the curve from a minimum to a maximum actuation value or vice versa. In FIG. 9 the time t and the intensity I are represented in arbitrary units. At certain time values the time dependency of the intensity I(t) has distinct intensity peaks or calibration peaks. In particular, the curve I(t) has a sharp, left-hand peak (a), a sharp, right-hand peak (c) and a somewhat broader central peak (m). The sharp, left-hand peak (a) corresponds to the beam configuration represented in FIG. 6 if the reflection from the concave surface 81 of the meniscus lens 80 is concentrated at the light-coupling point 17 of the optical fiber 16 and so enters the optical fiber 16 in concentrated form. The beam configuration represented in FIG. 7 occurs between the two peaks (a) and (c) if the light-coupling point 17 lies between the two focus points of the light reflected back by the concave surface 81 and by the convex surface 82 of the meniscus lens 80. In this case neither the reflection from the concave surface 81 nor the reflection from the convex surface 82 can be correctly coupled into the optical fiber 16. It is during this interval that the peak (m) caused by the light reflected by the workpiece 4 to be machined and that allows the distance from the workpiece 4 to be measured (measuring peak), occurs. The right-hand peak (c) corresponds to the beam configuration represented in FIG. 8 if the reflection from the convex surface 82 of the meniscus lens enters the optical fiber 16 in concentrated form at the light-coupling point 17. The sharp peaks (a) and (c) at the start and the end of the cycle illustrated, in particular, each have a well-defined position in time and can therefore be used as the basis for the precise calibration of the distance measuring device. The peaks (a) and (c) can be identified easily and assigned to the relevant beam configuration using the characteristic curve of the intensity curve.

Figure 10:
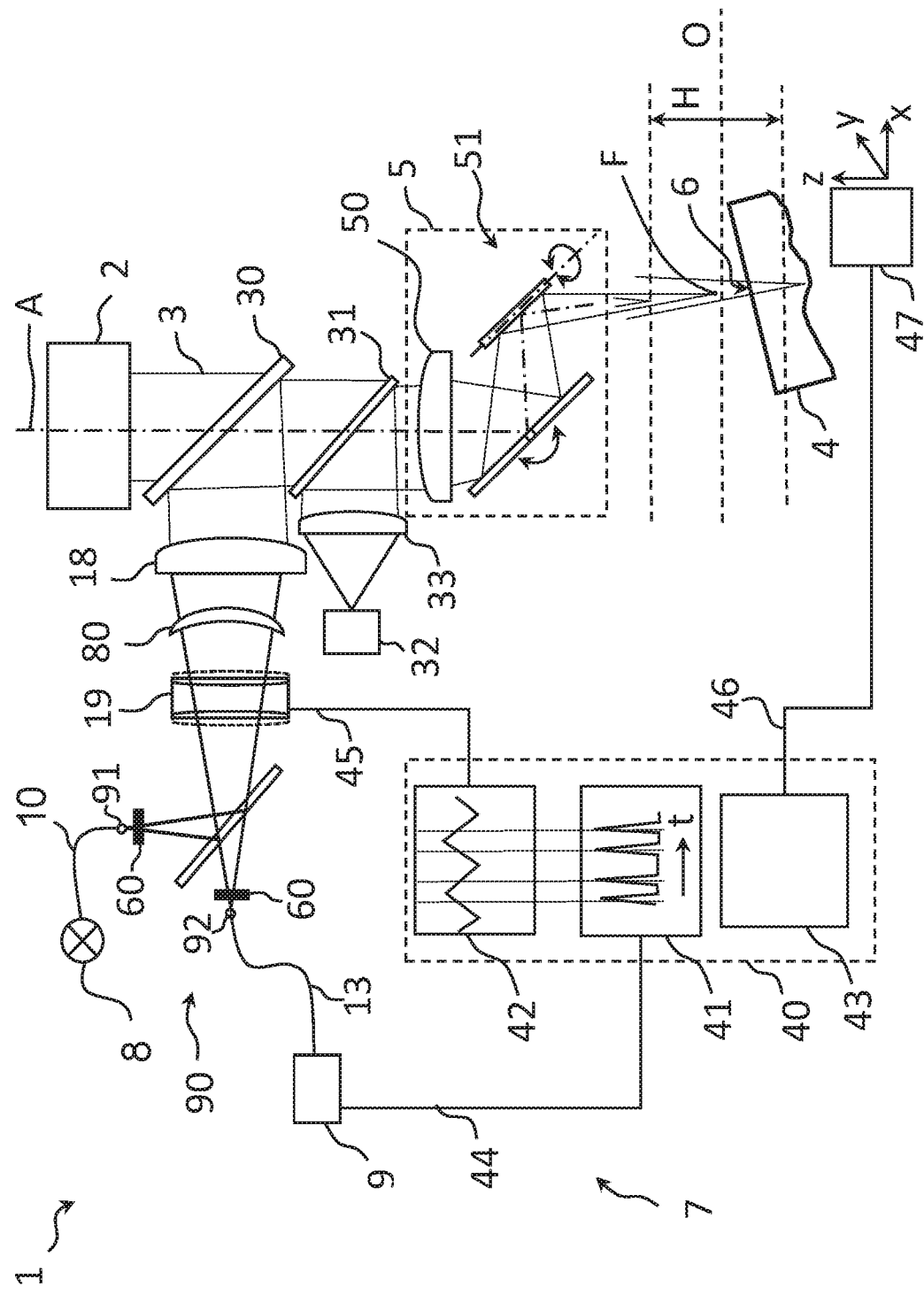
FIG. 10 shows in schematic form a device for the controlled machining of a workpiece according to another embodiment.

FIG. 10 shows in schematic form a device for the controlled machining of a workpiece according to another embodiment. The device 1 in FIG. 10 corresponds essentially to the device 1 illustrated in FIG. 1 though instead of a fiber coupler it comprises a beam splitter 90 designed to couple in the measuring light via a light-exit end 91 of a first optical fiber 10 and couple out the measuring light reflected back by the workpiece 4 to be machined. The measuring light coupled out by the beam splitter 90 can be coupled into a light-entry end 92 of a second fiber 13 in order to be gathered by the photodetector. The light-exit end 91 of the first optical fiber 10 and the light-entry end 92 of the second optical fiber 13 are configured confocally in relation to one another. By using the beam splitter it is possible to avoid the disruptive scattered light effects that occur in the fiber couplers. In some embodiments the beam splitter 90 is designed as a beam splitter cube. Beam splitter cubes are robust and exhibit low stray losses.

In some embodiments the device 1 having the beam splitter 90 has at least one shadow mask.

In the example illustrated in FIG. 10 the device 1 has two shadow masks 60 of essentially identical design, one shadow mask 60 being arranged downstream of the light-exit end 91 of the first fiber 10 and the second shadow mask 60 being arranged upstream of the light-entry end 92 of the second optical fiber 13. The shadow masks 60 are arranged directly on the fiber ends of the first and second optical fibers 10, 13.

The shadow masks 60 can be of similar design to the shadow masks illustrated in FIGS. 1, 2 and 3 and described above. The shadow masks 60 are arranged and aligned that the holes 61 (not shown) in the two shadow masks 60 are aligned confocally in relation to one another.

Figure 11:
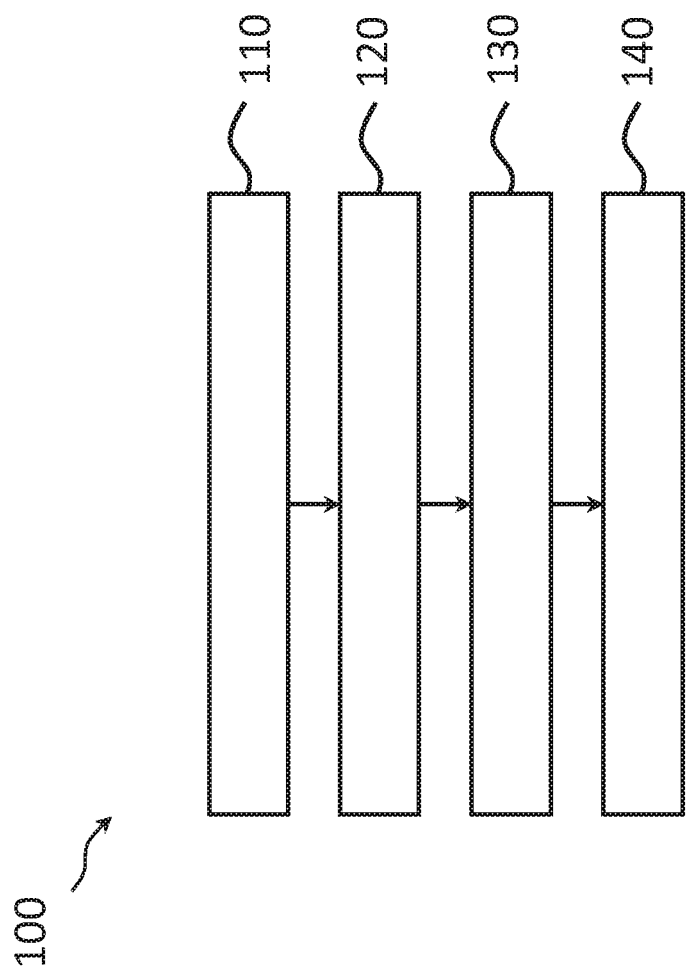
FIG. 11 shows a flow diagram of a method for the controlled machining of a workpiece according to one embodiment.

FIG. 11 shows a flow diagram of a method for the controlled machining of a workpiece according to one embodiment.

The method 100 for the controlled machining of a workpiece comprises a plurality of steps that can be carried out in different sequences and repeated if necessary. The method can, for example, be carried out by means of a device according to FIG. 1 or 2.

In a step 110 a laser light beam for generating a laser focus point is focused on a target point of the workpiece to be machined. The focusing of the laser light beam can in particular be carried out using the laser target optics in order to concentrate the laser beam at the target point of the workpiece to be machined. The focusing of the laser light beam in step 110 can, in particular, take place at a low laser output such that no or only little material machining of the workpiece 4 to be machined takes place in step 110. The focusing of the laser light beam can also be carried out using an auxiliary laser, e.g. a HeNe laser with a beam that is coupled into the beam path of the laser light beam collinear with the laser beam, for example with a deflection plate. A galvo scanner with two pivoting galvo mirrors can be used as the laser target optics or scanner.

In a step 120 optical distance measuring data is gathered by means of an optical distance measuring device in order to determine the distance between the target point of the workpiece to be machined and the laser target optics or a reference point or reference plane of the laser target optics. The distance measuring device can be designed as a confocal optical distance measuring device having a measuring light source for generating a measuring light, in particular a broadband measuring light in the near-infrared spectral range, and having a variable-focal-length measuring lens system, in particular a variable-focal-length lens, it being possible for the method to comprise the variation over time of the focal length of the variable-focal-length measuring lens system in order to gather distance measuring data at different focal length values of the variable-focal-length measuring lens system.

The gathering of distance measuring data can, in particular, comprise the gathering of the intensity of a measuring light reflected back by the workpiece to be machined such that the distance is determined using the intensity, in particular using a time curve of the intensity of a measuring light reflected back by the workpiece.

In a step 130 the workpiece to be machined is positioned in relation to the laser focus point based on the distance measuring data gathered. In some embodiments the laser is re-focused as an alternative or in addition to the positioning of the workpiece to be machined.

In a step 140 the target point of the workpiece to be machined is machined with the focused laser beam.

In some embodiments the variation over time of the focal length of the variable-focal-length measuring lens system comprises the tuning, in particular the cyclical tuning, of the focal length of the variable-focal-length measuring lens system in order to gather distance measuring at different focal lengths of the variable-focal-length measuring lens system.

The focal length variation of the variable-focal-length measuring lens system can, in particular, be carried out using a variable-focal-length optical element, in particular a variable-focal-length lens.

A measuring cycle can typically last 25 ms. During the measuring cycle the optical power of the variable-focal-length lens can, for example, be tuned within a range of +/−13 dioptres, it being possible to shift the focus point of the measuring light by some +/7 mm axially or along the optical axis of the measuring lens system.

With a known relationship between cycle points and focus point positions it is possible to determine the distance to the workpiece to be machined using the intensity maxima.

In order to determine the relationship between cycle points and distances, in some embodiments a calibration measurement is carried out, in particular in advance of laser machining.

Although at least one exemplary embodiment was described in the preceding description, it is also possible to make various changes and modifications. The aforementioned embodiments are merely examples and are not intended to limit the scope of validity, the applicability or the configuration of this disclosure in any way. In fact, the preceding description provides the person skilled in the art with a plan for implementing at least one exemplary embodiment, it being possible to make numerous changes to the mode of operation and the arrangement of elements described in an exemplary embodiment without leaving the scope of the attached claims and their legal equivalents.

LIST OF REFERENCE NUMERALS

1 Device
2 Laser
3 Laser light beam
4 Workpiece
5 Laser target optics
6 Target point
7 Distance measuring device
8 Measuring light source
9 Photodetector
10 First optical fiber
11 First connection point
12 Fiber coupler
13 Second optical fiber
14 Second connection point
15 Third connection point
16 Third optical fiber
17 Light-coupling point
18 Collimation lens
19 Variable-focal-length lens
30 Deflection plate
31 Deflection plate
32 Camera
33 Collimation lens
40 Evaluation and control unit
41 Evaluation unit
42 Lens control unit
43 Positioning control unit
44 Signal line
45 Lens control line
46 Positioning control line
47 Positioner
50 Focusing lens
51 Mirror pair
60 Shadow mask
61 Hole
80 Meniscus lens
81 Concave surface
82 Convex surface
83 Circular hole 90 Beam splitter
91 End of first optical fiber
92 End of second optical fiber
100 Method
110 Focusing
120 Gathering of distance measuring data
130 Positioning
140 Machining
A Optical axis
F Focus point
H Measuring range
O Zero plane
t Time coordinates
X, y, z Spatial coordinates

What is claimed is:

1. A method for the controlled machining of a workpiece comprising:
    focusing, by a laser target optics, a laser light beam in order to generate a laser focus point at a target point on the workpiece to be machined;
    measuring a distance between the target point on the workpiece to be machined and the laser target optics, by evaluating distance measuring data gathered by an optical distance measurement device;
    machining the target point on the workpiece to be machined using the laser light beam focused by the laser target optics;
    wherein the optical distance measuring device is designed as a confocal optical distance measuring device having a measuring light source configured to generate a measuring light and having a variable-focal-length measuring lens system;
    wherein the method further comprises varying, over time, a focal length of the variable-focal-length measuring lens system in order to gather distance measuring data at different focal length values of the variable-focal-length measuring lens system;
    wherein the varying over time of the focal length of the variable-focal-length measuring lens system comprises cyclical tuning of the focal length of the variable-focal-length measuring lens system such that a focal length range of the variable-focal-length measuring lens system between a minimum focal length and a maximum focal length is covered; and
    synchronizing the evaluating of the distance measuring data with the variation of the focal length in order to gather distance measuring data at different focal lengths of the variable-focal-length measuring lens system.

2. The method of claim 1, further comprising positioning the workpiece to be machined in relation to the laser focus point based on the distance measuring data gathered.

3. The method of claim 1, wherein the gathering of the distance measuring data comprises gathering an intensity of a reflected measuring light, the reflected measuring light comprising the measuring light as reflected back by the workpiece to be machined, and the distance being determined using a time curve of the intensity of the reflected measuring light.

4. The method of claim 1, further comprising performing a calibration measurement in order to determine a relationship between a cycle point of time and distance.

5. The method of claim 4, wherein the performing of the calibration measurement comprises gathering reflexes of a meniscus lens arranged downstream of the variable-focal-length measuring lens system.

6. The method of claim 1, wherein the optical distance measuring device gathers the distance measuring data at a plurality of measuring points at the target point.

7. The method of claim 6, wherein the optical distance measuring device gathers the distance measuring data sequentially within a measuring cycle at the plurality of measuring points.

8. The method of claim 7, wherein the plurality of measuring points are arranged along a scan path at the target point.

9. The method of claim 8, wherein the scan path has a shape of one of a circle surrounding the target point on the workpiece to be machined and a spiral centered on the target point on the workpiece to be machined.

10. The method of claim 7, wherein the optical distance measuring device gathers the distance measuring data substantially simultaneously at the plurality of measuring points, and wherein the distance is determined using physically averaged distance measuring data.

11. The method of claim 10, further comprising splitting, by at least one shadow mask having a plurality of holes, the measuring light into a plurality of partial measuring lights in order to simultaneously gather distance measuring data at the plurality of measuring points.

12. The method of claim 11, wherein the plurality of partial measuring lights are gathered simultaneously using a common photodetector.

13. A device for the controlled machining of a workpiece, comprising:
    a laser light source for generating a laser light beam for machining the workpiece to be machined;
    a laser target optics for focusing the laser light beam on a laser light focus point at a target on the workpiece to be machined;
    a distance measuring device for determining a distance between the target of the workpiece to be machined and the laser target optics through an evaluation of distance measuring data gathered by the distance measuring device;
    a positioning device for positioning the workpiece to be machined in relation to the laser light focus point; and
    an evaluation and control unit configured to evaluate the distance measuring data gathered and to actuate the positioning device based on the distance measuring data gathered;
    wherein the distance measuring device is designed as a confocal optical distance measuring device having a measuring light source for generating a measuring light and having a variable-focal-length measuring lens system such that a focal length of the variable-focal-length measuring lens system can be varied over time in order to gather the distance measuring data at different focal length values of the variable-focal-length measuring lens system;
    wherein the confocal optical distance measuring device is configured to vary over time the focal length of the variable-focal-length measuring lens system by cyclically tuning the focal length of the variable-focal-length measuring lens system such that a focal length range of the variable-focal-length measuring lens system between a minimum focal length and a maximum focal length is covered and such that the evaluation of the distance measuring data is synchronized with the variation of the focal length in order to gather distance measuring data at different focal lengths of the variable-focal-length measuring lens system.

14. The device of claim 13, wherein the measuring lens system of the distance measuring device comprises the laser target optics.

15. The device of claim 13, wherein the distance measuring device comprises a photodetector for gathering an intensity of a measuring light reflected back by the workpiece to be machined, the photodetector configured to determine the distance using a time curve of the gathered intensity of the measuring light reflected back by the workpiece.

16. The device of claim 13, wherein the measuring light source comprises a broadband infrared light source.

17. The device of claim 16, wherein the broadband infrared light source is a near-infrared light source.

18. The device of claim 13, wherein the variable-focal-length measuring lens system is arranged in a diverging part of an imaging system of the distance measuring device.

19. The device of claim 13, wherein the variable-focal-length measuring lens system comprising a variable-focal-length lens.

20. The device of claim 13, further comprising at least one shadow mask with a plurality of holes for splitting the measuring light into a plurality of partial measuring lights.

21. The device of claim 20, further comprising an optical fiber with a light-coupling point for coupling the measuring light in and out, wherein the at least one shadow mask is arranged at the light-coupling point.

22. The device of claim 20, further comprising:
a first optical fiber with a light-exit end;
a second optical fiber with a light-entry end;
a first shadow mask arranged at the light-exit end; and
a second shadow mask arranged at the light-entry end.

* * * * *